United States Patent
Hedtke et al.

(10) Patent No.: US 9,473,303 B2
(45) Date of Patent: Oct. 18, 2016

(54) METHOD AND SYSTEM FOR PRODUCT AUTHENTICATION

(71) Applicant: Rosemount Inc., Chanhassen, MN (US)

(72) Inventors: Robert C. Hedtke, Young America, MN (US); Dale Scott Davis, Prior Lake, MN (US); John P. Schulte, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 70 days.

(21) Appl. No.: 13/900,694

(22) Filed: May 23, 2013

(65) Prior Publication Data

US 2014/0351588 A1    Nov. 27, 2014

(51) Int. Cl.
  *H04L 9/32*    (2006.01)

(52) U.S. Cl.
  CPC .............. *H04L 9/32* (2013.01); *H04L 9/3226* (2013.01)

(58) Field of Classification Search
  CPC .................................................. H04L 63/0876
  USPC .......................................................... 713/168
  See application file for complete search history.

(56) References Cited

U.S. PATENT DOCUMENTS

| | | | | |
|---|---|---|---|---|
| 5,390,297 A | * | 2/1995 | Barber et al. | 726/29 |
| 6,131,088 A | * | 10/2000 | Hill | G06Q 30/02 |
| | | | | 705/26.62 |
| 8,352,744 B2 | * | 1/2013 | Kruse | G06K 19/10 |
| | | | | 380/51 |
| 2004/0143746 A1 | * | 7/2004 | Ligeti | G06F 21/10 |
| | | | | 713/185 |
| 2004/0199778 A1 | * | 10/2004 | Wernet | G06F 21/64 |
| | | | | 713/189 |
| 2006/0010503 A1 | | 1/2006 | Inoue et al. | |
| 2008/0179390 A1 | | 7/2008 | Harjani | |
| 2009/0250512 A1 | * | 10/2009 | Deck | G06Q 30/06 |
| | | | | 235/375 |
| 2009/0276621 A1 | | 11/2009 | Matsuo | |
| 2012/0234908 A1 | | 9/2012 | Wang et al. | |

FOREIGN PATENT DOCUMENTS

EP    2453398 A1    5/2012

OTHER PUBLICATIONS

The International Search Report mailed Sep. 15, 2014 for International Application No. PCT/US2014/038977.

* cited by examiner

*Primary Examiner* — Peter Shaw
(74) *Attorney, Agent, or Firm* — Kinney & Lange, P.A.

(57) ABSTRACT

During manufacturing a unique encrypted authentication code is created for each product based upon device specific information relating to that product. The unique encrypted authentication code together with the device specific information is stored in a database, and a representation of the unique encrypted authentication code is stored on the product. To determine whether a product in question is authentic, the readable representation of the unique encrypted authentication code is read and sent to a server along with a request for product authentication. The server provides an indication of authenticity of the product in question based upon the unique encrypted authentication code received and the device specific information associated with that unique encrypted authentication code in the database.

14 Claims, 3 Drawing Sheets

METHOD AND SYSTEM FOR PRODUCT AUTHENTICATION

BACKGROUND

Counterfeit products are ubiquitous—counterfeit money, credit cards, pharmaceuticals, computers, purses, software, and a large variety of other products are encountered by the public. The consequences to the manufacturers of the authentic goods can be substantial. Consequences include not only lost sales, but also brand damage when counterfeit products fail, underperform, or exhibit poor quality. Telling the customer that the product he or she purchased is a counterfeit may do little to address the unhappy experience associated with the product.

With some types of products, another important consideration is product safety. One example involves industrial process monitoring and control devices, which have been the subject of counterfeiting in recent years. These products, which may be used to monitor or control critical operations in a chemical plant, oil refinery, pharmaceutical manufacturing plant or the like, must meet intrinsic safety and explosion proof certification. In addition, the accuracy of measurements taken by the devices is important to safety of the process and to the quality of products created by that process.

Numerous counterfeiting countermeasures have been used in an attempt to help identify counterfeit products and deter potential counterfeiters. These countermeasures can include holographic labeling, RFID tags, hidden marks, and chemical signatures. Key requirements for an effective counterfeiting countermeasure include low cost, ease of use, and difficulty in compromising.

SUMMARY

A method of product authentication includes creating, for each product, a unique encrypted authentication code based on device specific information relating to that product. The unique encrypted authentication code and the device specific information for that product are stored in a database. In addition, a readable representation of the unique encrypted authentication code is stored on the product. Authenticating a particular product in question involves receiving a request for product authentication that includes the unique encrypted authentication code stored on the product in question. An indication of authenticity of the product in question is provided based upon the unique encrypted authentication code received with the request and the stored device specific information associated with that unique encrypted authentication code in the database.

A system for product authentication includes a reader that uploads device specific information relating to a product being manufactured and an authentication code generator that creates for the product a unique encrypted authentication code based upon the uploaded device specific information relating to that product. A database stores, for each product, the unique encrypted authentication code and the device specific information associated with that product. A readable representation of the unique encrypted authentication code is carried by the product. A server receives a request for product authentication that includes the unique encrypted authentication code read from a product in question. The server provides an indication of authenticity of the product in question based upon the unique encrypted authentication code received with the request and the device specific information associated with that unique encrypted authentication code in the database.

DETAILED DESCRIPTION

In the following description, systems and methods for authentication of products that could be subject to counterfeiting are shown. The products involved are of the type in which each individual product is uniquely identified. For the purpose of this description, examples of the products involved will be field devices used in industrial process monitoring and/or control system, as well as individual modules or components of those devices. It should be understood, however, that the system and method described is applicable to any type of product where each individual product manufactured is to be uniquely identifiable.

Figure 1:
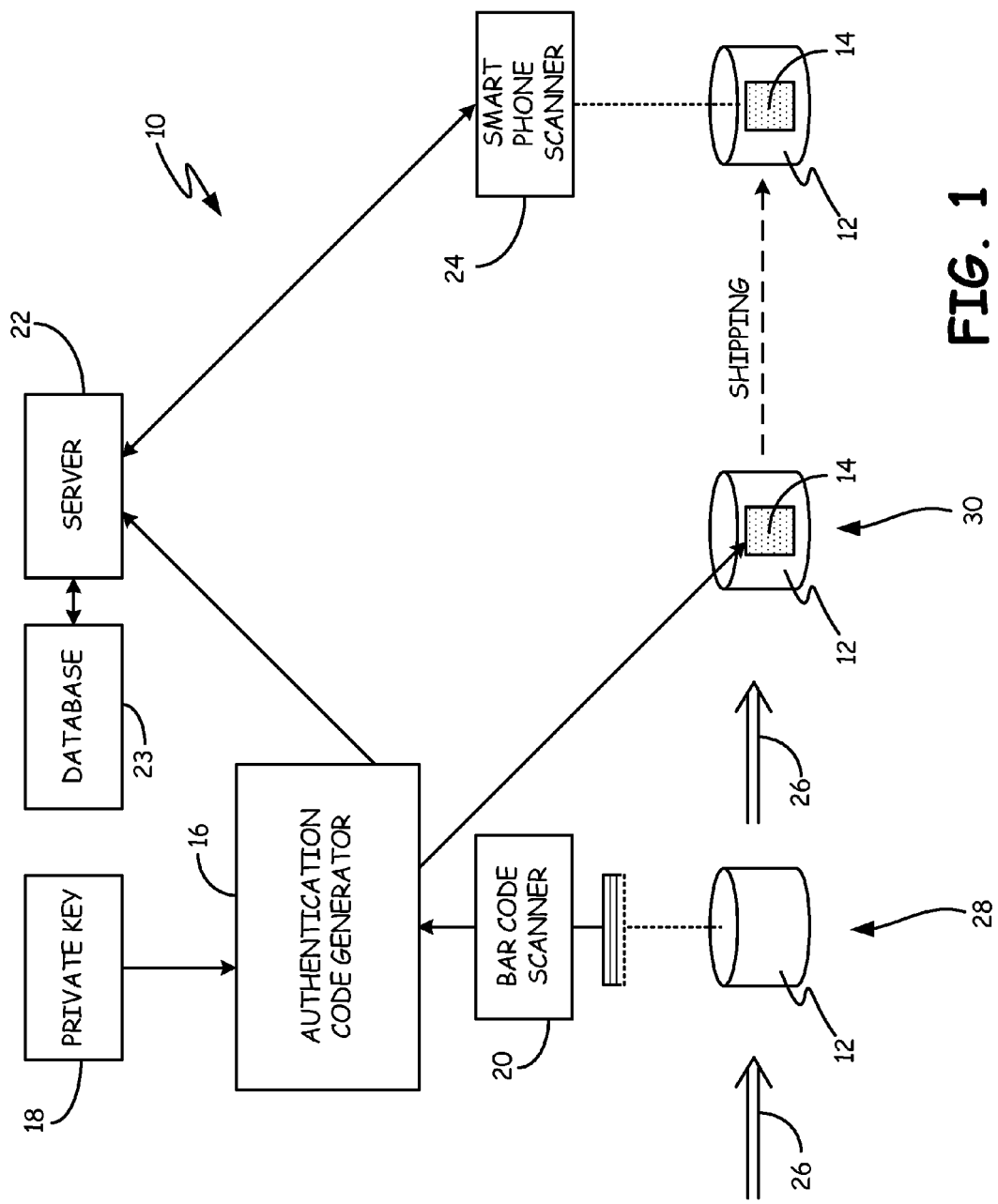
FIG. 1 is a block diagram illustrating a system and method for product authentication in which an authentication label containing a unique encrypted authentication code is applied to a product.

FIG. 1 shows an embodiment of authentication system 10 which provides authentication for product 12 through the use of authentication label 14. System 10 includes authentication code generator 16, private key 18, bar code scanner 20, server 22, database 23, and smart phone scanner 24.

In this embodiment, product 12 is, for example, a field device such as a transmitter, actuator, or modules or components of a field device used in an industrial process monitoring or control system. FIG. 1 shows product 12 proceeding along final assembly line 26. Product 12 has associated with it a bar code that identifies product 12 uniquely. Bar code may contain or may be associated in a database with device specific data such as model number, serial number, customer, date of manufacture, location where product 12 was manufactured, location of the customer, and device configuration information specific to product 12. When product 12 reaches stage 28 along final assembly line 26, bar code scanner 20 (reader) scans (reads) the bar code, which allows authentication code generator 16 to retrieve the device specific data associated with product 12.

Authentication code generator 16 produces a unique encrypted authentication code using private key 18 and some or all of the other device specific data. Private key 18 is provided to authentication code generator 16 periodically. For example, a new private key may be provided each week, month, or calendar quarter.

Authentication code generator 16 sends the device specific data and the unique encrypted authentication code to server 22. This information is stored in database 23 accessible by server 22, and is subsequently used in authentication of a product in the field.

Authentication code generator 16 prints authentication label 14, which contains the unique encrypted authentication code. Authentication label 14 is attached to product 12 at station 30.

Upon completion of assembly in packaging, product 12 is shipped to a customer. At a later time, the customer, or another party may wish to verify that product 12 is an authentic product from the manufacturer. This authentication takes place through the use of a scanning device such as smart phone scanner 24. The code contained in authentication label 14 is scanned, and the unique encrypted authentication code is sent to server 22 with a request for authentication.

Upon receipt of a request for authentication from smart phone scanner 24, together with the unique encrypted authentication code read by smart phone scanner 24, server 22 retrieves from database 23 data associated with that unique encrypted authentication code. That data includes other device specific data.

Server 22 returns to smart phone scanner 24 a message that the product in question is not authentic when there is no match within database 23 for the particular unique encrypted authentication code.

If the unique encrypted authentication code sent by smart phone scanner 24 is found by server 22 in database 23, then server 22 returns a message with certain device specific data that is stored in the database corresponding to the unique encrypted authentication code. For example, server 22 may send smart phone scanner 24 the model number, serial number, customer name, and customer location that is stored, so that the person who scanned authentication label 14 can check the product in question to see whether the model number, serial number, customer name, and customer location of the product match the data from server 22.

System 10 also allows server 22 to provide an indication if clones of an authentic product appear to be in existence. If authentication label 14 of an authentication product has been duplicated and used on counterfeit goods, server 22 may have received multiple inquiries relating to the same unique encrypted authentication code. This indicates that more than one product, and duplicates of the authentication label containing the unique encrypted authentication code are in existence.

The embodiment described above includes smart phone scanner 24 as an exemplary hand-held scanning device. However, it is understood that the present invention encompasses embodiments including other scanning devices.

Figure 2:
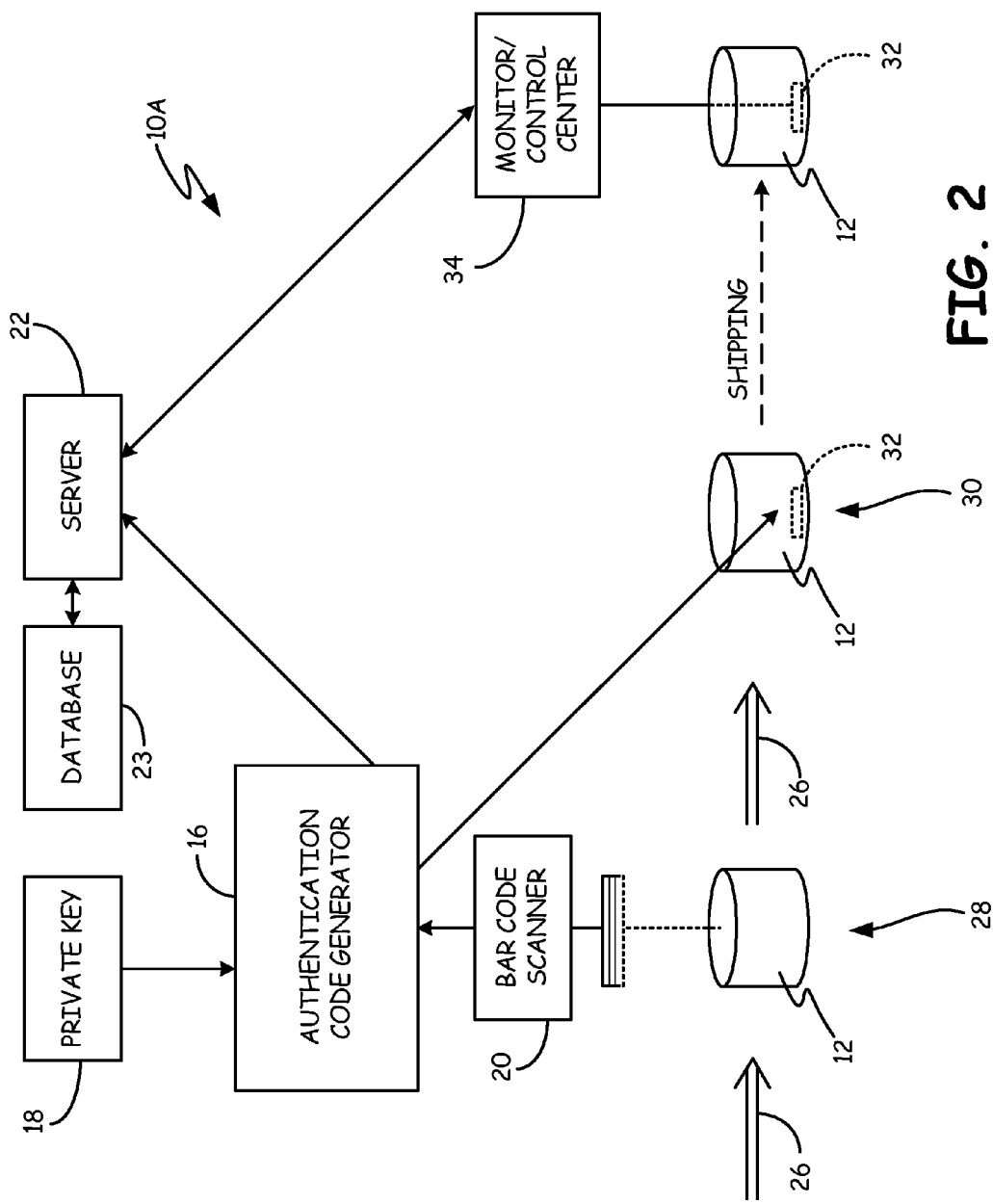
FIG. 2 is a block diagram of a system and method for product authentication in which a unique encrypted authentication code is stored in memory of a product.

FIG. 2 shows system 10A, which is another embodiment of an authentication system. System 10A uses a unique encrypted authentication code that is stored within memory 32 of product 12, rather than authentication label like authentication label 14 shown in FIG. 1. Components of system 10A are similar to components in system 10 of FIG. 1, and similar reference numbers are used to identify similar components.

In system 10A, authentication code generator 16 uploads device specific data based upon a bar code read by bar code scanner 20. A unique encrypted authentication code is generated using private key 18, and some or all of the other device specific data. The unique encrypted authentication code, together with the other device specific data, is sent to server 22 for storage and later use in the authentication process. The unique encrypted authentication code is stored by authentication code generator 16 in memory 32 within product 12. For example, the HART register of a field device capable of communicating using the HART communication protocol can be used for storing the unique encrypted authentication code. For other types of devices, other memory locations can be used to store the unique encrypted authentication code.

After completion of final assembly and packaging, product 12 is shipped to the customer. The customer will then install product 12 into a system that is capable of communicating digitally with server 22. In the specific embodiment illustrated in FIG. 2, product 12 is installed in an industrial process monitoring or control system that includes monitor/control center 34. Monitor/control center 34 can communicate with product 12 using the HART protocol, and can access the contents of memory 32, including the unique encrypted authentication code. Monitor/control center 34 then communicates the unique encrypted authentication code to server 22, which performs an authentication using the data stored within database 23 that is associated with that unique encrypted authentication code. Server 22 then communicates the results of its authentication process to monitor/control center 34. In other embodiments, communication between monitor/control center 34 and product 12 may employ other protocols such as Fieldbus or Profibus communication protocol over a digital bus, or wireless communication over a wireless network using a wireless protocol such as WirelessHART (IEC 62951). Customers often do not allow connections from the process control plant to the internet. In these cases the monitor/control center can read the encrypted authentication code which can then be manually transferred to another device such as a smart phone to communicate back to the server.

System 10A has the ability to identify a product having a nonexistent authentication code, as well as a product having an existing unique encrypted authentication code that does not match the model number, serial number, or other device specific data associated with the unique encrypted authentication code. As described with respect to FIG. 1, server 22 may also indicate the existence of clones. In this case, the clones could be multiple products having the same unique encrypted authentication code stored in memory of the products.

Figure 3:
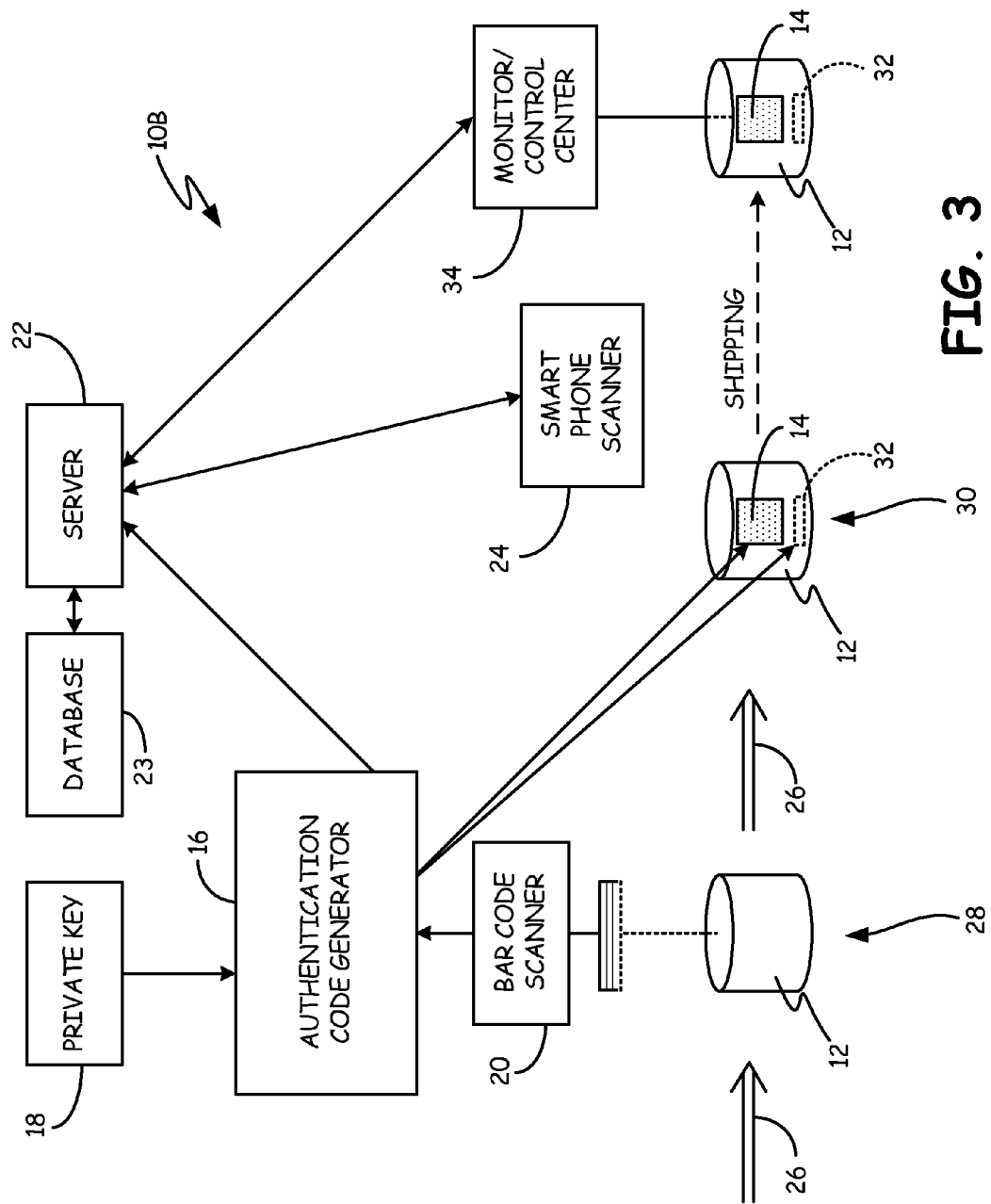
FIG. 3 is a block diagram of a system and method in which an authentication label containing a unique encrypted authentication code is applied to a product, and the unique encrypted authentication code is also stored in memory of the product.

FIG. 3 shows system 10B, which combines the features of FIG. 1 and FIG. 2. Similar reference numerals are used identify similar elements.

In system 10B, authentication code generator 16 stores the unique encrypted authentication code on product 12 in two different forms. The unique encrypted authentication code is stored in authentication label 14 that is applied to product 12. In addition, the unique encrypted authentication code is stored in memory 32 of product 12.

System 10B allows authentication of a product in question to be performed by an individual using a scanner such as smart phone scanner 24 or by monitor/control center 34. Server 22 receives an input request for an authentication check, and performs a check as described with reference to systems 10 and 10A, and then reports the results back to the requesting device, either smart phone scanner 24 (or other scanner) or monitor/control center 34.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of authenticating field devices, the method comprising:
   manufacturing the field devices, each field device configured for use in an industrial process monitoring or control system, wherein the manufacturing includes:
      applying a barcode to each field device that uniquely identifies the respective field device;
      reading, by a reader device, the barcode applied to each field device to uniquely identify each field device;
      creating, for each field device, a unique encrypted authentication code based on a private key and device specific information relating to the uniquely identified field device;
      storing, for each field device in a database, the unique encrypted authentication code and the device specific information for the field device associated with the unique encrypted authentication code; and
      storing, on each field device, a readable representation of the unique encrypted authentication code for that field device, wherein the readable representation of the unique encrypted authentication code is in encrypted form that requires decryption with the private key;
   receiving a request for product authentication that includes the unique encrypted authentication code stored on a field device in question; and
   providing an indication of authenticity of the field device in question based upon the unique encrypted authentication code received with the request and the stored device specific information associated with that unique encrypted authentication code in the database, wherein providing the indication of authenticity includes:
      providing an indication that the field device in question is not authentic if the unique encrypted authentication code is not stored in the database;
      providing an indication that the field device in question is authentic if the unique encrypted authentication code is stored in the database; and
      providing an indication that clones of the field device may exist if multiple requests with the same unique encrypted authentication code have been received.

2. The method of claim 1, wherein storing, on each field device, a readable representation of the unique encrypted authentication code comprises applying a scannable label bearing the unique encrypted authentication code in machine readable form to the field device associated with that unique encrypted authentication code.

3. The method of claim 2, wherein the request is received from a scanning device.

4. The method of claim 1, wherein storing, on each field device, a readable representation of the unique encrypted authentication code comprises storing the unique encrypted authentication code in memory of the field device associated with that unique encrypted authentication code.

5. The method of claim 4, wherein the request is received from a system in which the field device is installed.

6. The method of claim 1, wherein the device specific information includes at least one of model number, serial number, customer, date of manufacture, location of manufacture, location of customer, and device configuration information.

7. A system for authenticating field devices, the system comprising:
   a reader device that, during a manufacturing process of the field devices configured for use in an industrial process monitoring or control system, reads a barcode applied to each field device to uniquely identify each field device;
   an authentication code generator that, during the manufacturing process of the field devices, creates, for each field device being manufactured, a unique encrypted authentication code based upon a private key and device specific information relating to the uniquely identified field device;
   a database that stores, for each field device, the unique encrypted authentication code and the device specific information associated with that field device;
   a readable representation of the unique encrypted authentication code carried by the field device, wherein the readable representation of the unique encrypted authentication code is in encrypted form that requires decryption with the private key; and
   a server device comprising a processor that receives a request for product authentication that includes the unique encrypted authentication code read from a field device in question and provides an indication of authenticity of the field device in question based upon the unique encrypted authentication code received with the request and the device specific information associated with that unique encrypted authentication code in the database, wherein the server device:
      provides an indication that the field device in question is not authentic if the unique encrypted authentication code is not stored in the database;
      provides an indication that the field device in question is authentic if the unique encrypted authentication code is stored in the database; and
      provides an indication that clones of the field device may exist if multiple requests with the same unique encrypted authentication code have been received.

8. The system of claim 7, wherein the readable representation of the unique encrypted authentication code comprises a scannable label bearing the unique encrypted authentication code in machine readable form that is attached to the field device.

9. The system of claim 8, wherein the server device receives the request from a scanning device.

10. The system of claim 7, wherein the readable representation of the unique encrypted authentication code is stored in memory of the field device.

11. The system of claim 10, wherein the server device receives the request from a system in which the field device is installed.

12. The system of claim 11, wherein the field device is capable of communicating with the system in which the field device is installed by employing a digital communication protocol, and the memory of the field device storing the unique encrypted authentication code includes a register associated with the field device's communication protocol capability.

13. The system of claim 7, wherein the device specific information includes at least one of model number, serial number, customer, date of manufacture, location of manufacture, location of customer, and device configuration information.

14. The system of claim 7,
   wherein the reader device uploads, to the authentication code generator, the device specific information relating to each field device being manufactured.

* * * * *